Patented Mar. 21, 1950

2,501,647

UNITED STATES PATENT OFFICE 2,501,647

METHOD OF FORMING RESINOUS PRODUCTS DERIVED FROM HALOACRYLIC ACID COMPOUNDS

William O. Ney, Jr., Easton, Pa., assignor to General Aniline & Film Corporation, New York, N. Y., a corporation of Delaware No Drawing. Application June 23, 1945, Serial No. 601,346

11 Claims. (Cl. 260—89.5)

1

This invention relates to the preparation of haloacrylic acid compounds and more particularly the polymers of esters of α-haloacrylic acid, as for example, polymerized alkyl α-chloracrylates and to such polymers which remain free from color formation even upon heating and/or exposure to ultraviolet light, or standing for extended periods of time.

The α-haloacrylic polymers, particularly the α-chloracrylates are characterized by their outstanding hardness and high softening point coupled with their thermoplastic properties. In order to impart maximum hardness, it is necessary to heat the polymers to above 100° C. for extended periods of time. However, the great disadvantage of these polymers is the formation therein of a yellow color particularly when heated and/or subjected to ultraviolet light, or when permitted to stand at room temperatures for long periods of time. This discoloration sometimes appears during polymerization, or it may develop sometime after the polymer has been formed, or when the polymer is heated or exposed to ultraviolet light.

Various methods have been proposed to reduce or suppress the formation of the yellow color, but complete suppression has not heretofore been obtained. As a result, up to the present it has not been possible to obtain transparent, colorless α-chloracrylate resins which are of practical use, for example, as glass substitutes in the fabrication of windows, lenses, optical equipment, and other articles where high transparency and freedom from any coloration is required.

The formation of the color has been attributed to the presence in the monomer of traces of so-called "autooxidation" products and in order to obtain a colorless polymer, it has been proposed in U. S. Patent 2,314,443 to remove these autooxidation products prior to polymerization of the chloracrylic compounds by distilling the monomer in a substantial absence of atmospheric oxygen after a preliminary treatment thereof with agents which tend to destroy the autooxidation products and then to polymerize in the absence of air or oxygen. However, such a treatment has at best succeeded in only partially suppressing discoloration, since a considerable amount of yellow color still appears in the polymer which has been so prepared.

To suppress further this tendency of the α-chloracrylic acid esters to develop yellow coloration, it has been proposed in U. S. Patent 2,345,126 to incorporate into the monomer, which has first been substantially freed from autooxidation products, according to the process of the first-mentioned patent, a stabilizer selected from the class consisting of certain polyhydric alcohols, and the partial esters and partial ethers thereof. But, a substantial amount of yellow color still appears in the polymer, and the polymer obtained has a lower softening point if substantial amounts of the stabilizers are used.

It has also been proposed in U. S. Patent 2,247,790 to reduce formation of color in the polymer by first dehydrating the monomer to render it anhydrous and then polymerizing the anhydrous monomer in an anhydrous atmosphere. However, such a process does not result in a polymer which remains colorless.

It is an object of the invention to provide a method for obtaining colorless polymers from α-haloacrylic acid compounds.

It is a further object of the invention to prepare α-haloacrylic compounds which are capable of polymerizing to polymers which do not discolor.

A still further object of the invention is to provide a method for producing polymers of α-chloracrylates which do not tend to develop a yellow coloration.

A further object of the invention is to provide a simple and economical procedure for obtaining colorless polymers of α-chloracrylates.

Another object of the invention is to provide a thermoplastic resin which may be readily shaped by molding, such as, for example, injection or compression molding, to form shaped articles which retain their shape, remain transparent, and free from color even when subjected to boiling water or higher temperatures.

According to copending U. S. application Serial No. 601,342, filed June 23, 1945, it has been determined that the cause of color formation in α-halogen substituted acrylic resins is due to the presence of oxalyl halide compounds, such as, for example, methyl oxalyl chloride in the case of methyl α-chloracrylate monomers. It is proposed to incorporate into the monomer any substance which in itself does not introduce color and which converts the oxalyl halide compound into a non-color forming compound thereby resulting in a monomer capable of forming a colorless polymer.

According to my invention, I have found water under certain conditions to be an effective agent for rendering the oxalyl halides present in the monomer inert and to result in a monomer capable of forming a colorless polymer.

Thus, it becomes possible according to my invention to produce colorless polymers free from the tendency to form color, without first rendering the monomer anhydrous and without carrying out polymerization under anhydrous or anaerobic conditions. According to my invention, colorless resins are secured by incorporating in the monomer a substantial amount of water. Preferably the monomer is saturated with water and contains all the water that will dissolve in the $\alpha$-haloacrylic compound. In the case of methyl $\alpha$-chloracrylate, the monomer is saturated when there is dissolved therein about 0.2 to 0.25% of water.

I have found that when a substantial amount of water is present in the monomer, up to the limit of solubility of water in the particular monomer employed, rigid precautions need not be taken against the monomer coming in contact with air or oxygen since colorless polymers are obtained even when the monomer comes in contact with air or oxygen either before and/or during polymerization. However, the longer the contact with air, the greater the amount of water required to prevent discoloration of the polymer. Thus, the amount of water required to prevent discoloration of the polymer varies depending on the extent of contact of the monomer with air. The range of concentrations of the water in the monomer may be from that just sufficient to prevent discoloration in the polymer to that which saturates or supersaturates the monomer. In general, this may vary from approximately .0025% to 0.25%, depending on the extent of contact of the monomer with air. In practice, it is preferred to saturate the monomer with water. If the monomer is anhydrous or contains an insufficient amount of water or moisture, a polymer is obtained which possesses a yellow discoloration.

Where the quantity of the oxalyl halide in the monomer may be large, the limited solubility of the water in the monomer may not permit water to dissolve therein in an amount sufficient to react with all of the oxalyl halide. Where this is the case, it has been found that color formation in the polymer can be prevented by adding to the water any of the monohydric alcohols proposed in the aforementioned application Serial No. 601,342, filed June 23, 1945. Among suitable alcohols may be mentioned: methyl, ethyl, n-propyl, isopropyl, n-butyl, secondary-butyl, tertiary-butyl, amyl, cyclohexyl, allyl, methallyl, crotyl, benzyl, and cinnamyl alcohols. The lower alkyl alcohols, such as methyl, propyl, butyl alcohols, and methyl alcohol in particular, are preferred. Instead of incorporating a mixture of water and alcohol in the monomer, the treatment may be carried out consecutively. Thus, a small amount of alcohol may be first dissolved in the monomer and the mixture then saturated with water to the limit of the solubility of the water therein. If desired, the steps of the treatment of the monomer may be reversed. In practice, the amount of alcohol utilized together with the water is such as will in combination react with all of the oxalyl halide present in the monomer, and that which may be formed during or after polymerization. In general, the amount of alcolhol may range from about 0.05% to 5%, although it is to be understood that where the amount of water incorporated in the monomer is sufficient to react with all the oxalyl halide, the alcohol may be omitted.

The incorporation of water in the monomer is equally effective in both thermal- and photo-polymerization methods to produce a colorless polymer. By this means, massive cast pieces of the material may be made which possess exceptional clarity and freedom from color that is maintained even upon exposure to ultraviolet light and/or elevated temperatures for extended periods of time. Larger amounts of water, in excess of that amount which will dissolve, may be added. However, the water which does not dissolve remains as droplets which may cause the formation of tiny bubbles or craters on the outer surface of the cast piece. Since this is not objectionable for some uses, it may be convenient to add an excess amount of water.

In general, the water may be added to the monomer after it is purified in the usual manner as by distilling under vacuum. It is advantageous to introduce the water into the monomer by steam distillation of the crude monomer.

Where the procedure of purifying the crude monomer results in an anhydrous product, such as when distilling under a vacuum, water is added to the monomer in an amount sufficient to impart the color preventing properties. In an alternative procedure, instead of adding the water to the monomer, the water may be added thereto by conducting the polymerization in a moist atmosphere, the moisture content thereof being so regulated that the amount of water effective to prevent discoloration is introduced into the monomer. In general, the water content of the monomer which imparts the desired property of preventing color formation may range from approximately .0025% to not more than 0.25%. Optimum results are obtained when the monomer is saturated or supersaturated with water, the preferred concentration being about 0.2%.

Since water has no plasticizing action on the polymers obtained, as may be the case in the use of alcohols to prevent color formation, color-free polymers of maximum hardness are obtained by my invention.

The following examples are illustrative of my invention:

*Example 1*

A sample of methyl $\alpha$-chloracrylate was distilled through a three-foot Vigreux column at 5 millimeters pressure. To the distilled monomer there was added water so that the content was about 0.2%. The monomer was then polymerized by exposing it in a sealed glass container to ultraviolet light for a period of about 6 hours at 25° C. The product was then heated for about 24 hours at 120° C. The resulting resin obtained was completely free from any yellow discoloration, was highly transparent, possessed a high softening point, and an outstanding degree of hardness. It is highly suitable as substitute for optical glass.

When the distilled monomer was polymerized as in the example, but without the addition of any water, a yellow colored polymer was obtained.

*Example 2*

A sample of methyl $\alpha$-chloracrylate was purified by steam distillation. The purified monomer was separated from the water by means of a separatory funnel, care being taken to prevent excessive contact with air. 0.01% of benzoyl peroxide was added to the wet monomer which was then sealed in a glass container.

The polymerization was carried out by heating in a water bath at a temperature of about 60° C. for 12 hours followed by a heat treatment at 120°

C. for about 24 hours. A highly transparent resin free from color was obtained.

Example 3

To freshly distilled dry methyl α-chloracrylate was added 0.01% benzoyl peroxide, and after this had dissolved, one-half the material was poured through the air into a glass container and sealed off. The other half was saturated with distilled water and then poured through the air into a similar container which was also sealed off. Both these samples were polymerized by heating at 35° C. for 24 hours, followed by 12 hours heating at 65° C. and finally by heating at 115° C. for 24 hours. At the end of this time, the glass was broken away from both samples and each was found to be hard and clear, but the sample which had been saturated with water was colorless, whereas the other piece had a distinct yellow color.

Example 4

0.08 part of benzoyl peroxide was dissolved in 800 parts of methyl α-chloracrylate. 1.6 parts of methanol were then dissolved in the material and the mixture was then saturated with water to the limit of the solubility of the water in the monomer. This wet mixture was poured through the air into a narrow-mouthed glass vessel and corked with an ordinary cork stopper covered with aluminum foil to prevent evaporation. Polymerization was effected by heating the mixture at 35° C. for 24 hours, followed by heating at 65° C. for 12 hours and finally by heating at 115° C. for 24 hours. After the final heating at 115° C., the glass was broken away from the hard resin which was found to be clear and colorless.

A polymer obtained in the same manner, but in which no methanol and water were added to the monomer was distinctly colored yellow.

In general, the polymerization may follow the usual procedure for polymerizing chloracrylates. However, my invention makes it unnecessary to carry out the distillation of the monomer and the polymerization thereof under anaerobic or anhydrous conditions.

Either light or any of the conventional catalysts may be used to promote the polymerization, such as, for example, benzoyl peroxide, succinyl peroxide, peracetic acid, and other peroxide or oxygen-containing catalysts. The temperature of polymerization may vary from approximately 20° C. or less to 125° C. or higher. It has been found that products of considerable hardness are obtained when the polymer is heated for an extended length of time at temperatures about 100° C. For example, the time may range from about 12 hours to 24 hours, the temperature being from 100° C. to 120° C.

While the above examples describe the application of the process to methyl α-chloracrylate with which it is particularly effective, it has been found also effective in the suppression of color formation where other α-haloacrylic compounds are polymerized. As examples of such compounds may be mentioned the various esters, such as alkyl esters of α-chloracrylic acid, for instance, the ethyl, propyl, butyl, amyl, n-hexyl, octyl, lauryl, octadecyl esters; likewise the alkenyl esters, for example, the allyl, methallyl, 2-chlorallyl, crotyl, oleyl, and cyclohexenyl α-chloracrylates. Color suppression is also effective when water is added to the polyhydric alcohol esters of α-chloracrylic acid, such as glycol, glycerol, mannitol, or sorbitol esters thereof.

My process is also effective in preventing color formation when polymerizing aryl, aralkyl, or heterocyclic esters of α-chloracrylates, such as phenyl, benzyl, cresyl, resorcinyl, naphthyl, phenyl ethyl, fenchyl, and furfuryl esters thereof.

The expression "up to 5%," referring to the proportion of alcohol in the appended claims, signifies the range 0–5%.

Since it is apparent that the invention may be varied without departing from the spirit and scope thereof, it is to be understood that the invention is not limited to the specific embodiments given above, but only in accordance with the appended claims.

I claim:

1. The process of producing colorless, color-stable transparent polymers, form-stable at temperatures exceeding 100° C., from monomeric polymerizable α-halogen substituted acrylic acid compounds, which consists in incorporating in the monomer from 0.0025 to 0.25% of water, and up to 5% of a monohydric alcohol having at most 9 carbon atoms and in which the hydroxyl radical is attached to a hydrocarbon radical, and then mass polymerizing the resulting monomer composition, stabilized against color, thus obtained.

2. The process of producing colorless, color stable transparent polymers, form-stable at temperatures exceeding 100° C., from monomeric polymerizable α-halogen substituted acrylic acid compounds, which consists in incorporating in the monomer from 0.0025 to 0.25% of water, and then mass polymerizing the resulting monomer composition stabilized against color, thus obtained.

3. The process of producing colorless, color stable transparent polymers, form-stable at temperatures exceeding 100° C., from monomeric polymerizable α-halogen substituted acrylic acid compounds, which consists in incorporating in the monomer from 0.0025 to 0.25% of water, and from 0.05 to 5% of a monohydric alcohol having at most 9 carbon atoms and in which the hydroxyl radical is attached to a hydrocarbon radical, and then mass polymerizing the resulting monomer composition, stabilized against color, thus obtained.

4. The process of producing colorless, color stable transparent polymers, form-stable at temperatures exceeding 100° C., from monomeric polymerizable α-halogen substituted acrylic acid compounds, which consists in incorporating in the monomer an amount of water sufficient to saturate the monomer, and up to 5% of a monohydric alcohol having at most 9 carbon atoms and in which the hydroxyl radical is attached to a hydrocarbon radical, and then mass polymerizing the resulting monomer composition, stabilized against color, thus obtained.

5. The process of producing colorless, color-stable transparent polymers, form-stable at temperatures exceeding 100° C., from monomeric polymerizable α-haloacrylic acid esters, which consists in incorporating in the monomer from 0.0025 to 0.25% of water, and up to 5% of a monohydric alcohol having at most 9 carbon atoms and in which the hydroxyl radical is attached to a hydrocarbon radical, and then mass polymerizing the resulting monomer composition, stabilized against color, thus obtained.

6. The process of producing a colorless, color stable transparent polymer, form-stable at temperatures exceeding 100° C., from methyl α-chloracrylate, which consists in incorporating in the monomer from 0.0025 to 0.25% of water, and then mass polymerizing the resulting monomer composition, stabilized against color, thus obtained.

7. A composition of matter adapted to form a colorless, color-stable transparent mass polymer, form-stable at temperatures exceeding 100° C., which consists of a polymerizable α-halogen substituted acrylic acid compound, from 0.0025 to 0.25% of water, and up to 5% of a monohydric alcohol having at most 9 carbon atoms and in which the hydroxyl group is attached to a hydrocarbon radical.

8. A composition of matter adapted to form a colorless, color-stable transparent mass polymer, form-stable at temperatures exceeding 100° C., which consists of a polymerizable ester of α-chloro-substituted acrylic acid, from 0.0025 to 0.25% of water, and up to 5% of a monohydric alcohol, having at most 9 carbon atoms and in which the hydroxyl group is attached to a hydrocarbon radical.

9. A composition of matter adapted to form a colorless, color-stable transparent mass polymer, form-stable at temperatures exceeding 100° C., which consists of methyl α-chloracrylate and from 0.0025 to 0.25% of water.

10. A composition of matter adapted to form a colorless, color stable transparent mass polymer, form-stable at temperatures exceeding 100° C., which consists of methyl α-chloracrylate, from 0.0025 to 0.25% of water, and from 0.05 to 5% of methanol.

11. The process of producing a colorless, color stable transparent polymer, form-stable at temperatures exceeding 100° C., from methyl α-chloracrylate, which consists in incorporating in the monomer from 0.0025 to 0.25% of water, and from 0.05 to 5% of methanol, and then mass polymerizing the resulting monomer composition, stabilized against color, thus obtained.

WILLIAM O. NEY, Jr.

REFERENCES CITED

The following references are of record in the file of this patent:

UNITED STATES PATENTS

| Number | Name | Date |
|---|---|---|
| 2,387,571 | Fikentscher et al. | Oct. 23, 1945 |

FOREIGN PATENTS

| Number | Country | Date |
|---|---|---|
| 411,860 | Great Britain | June 13, 1934 |